Patented Feb. 3, 1942

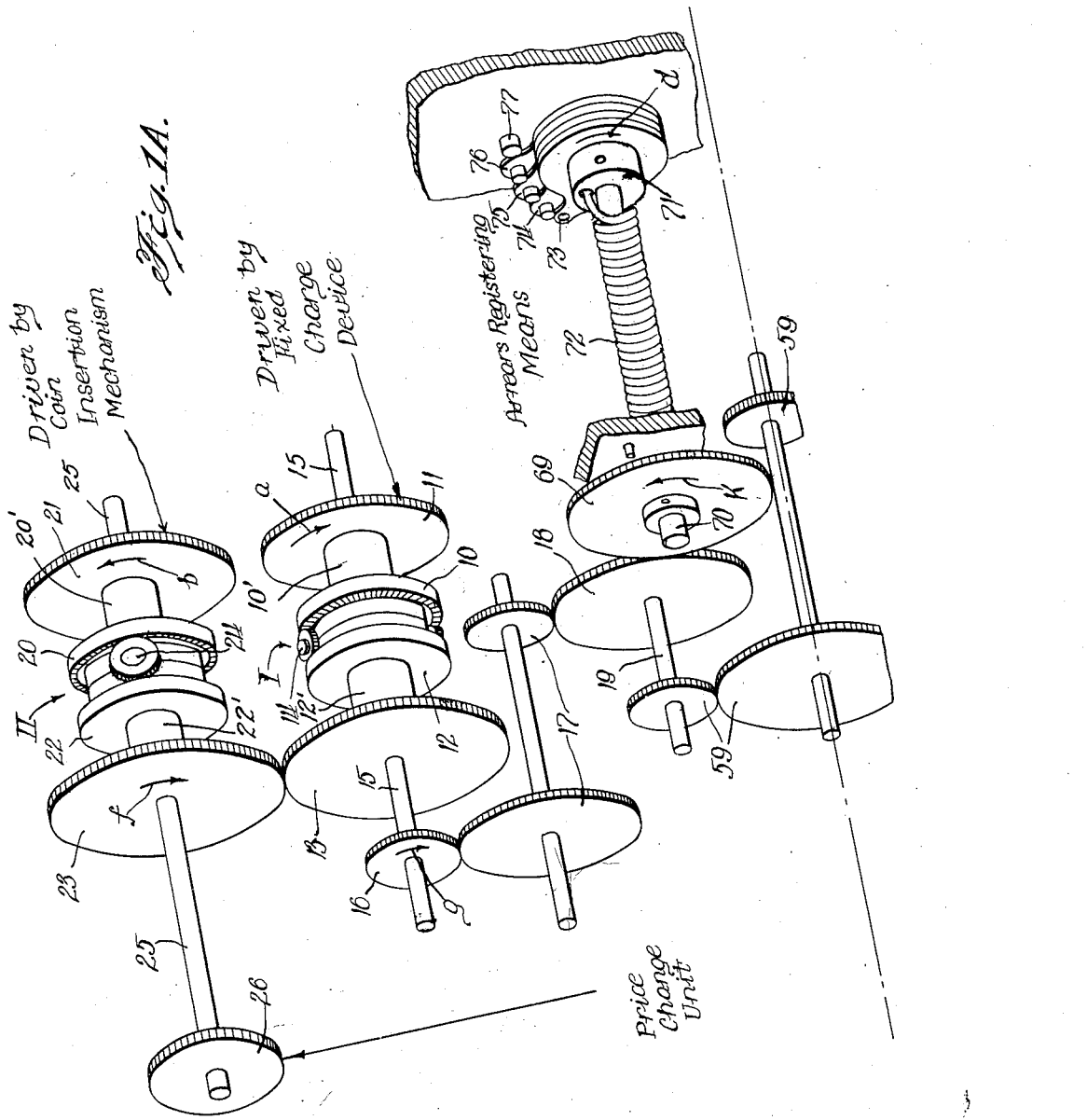

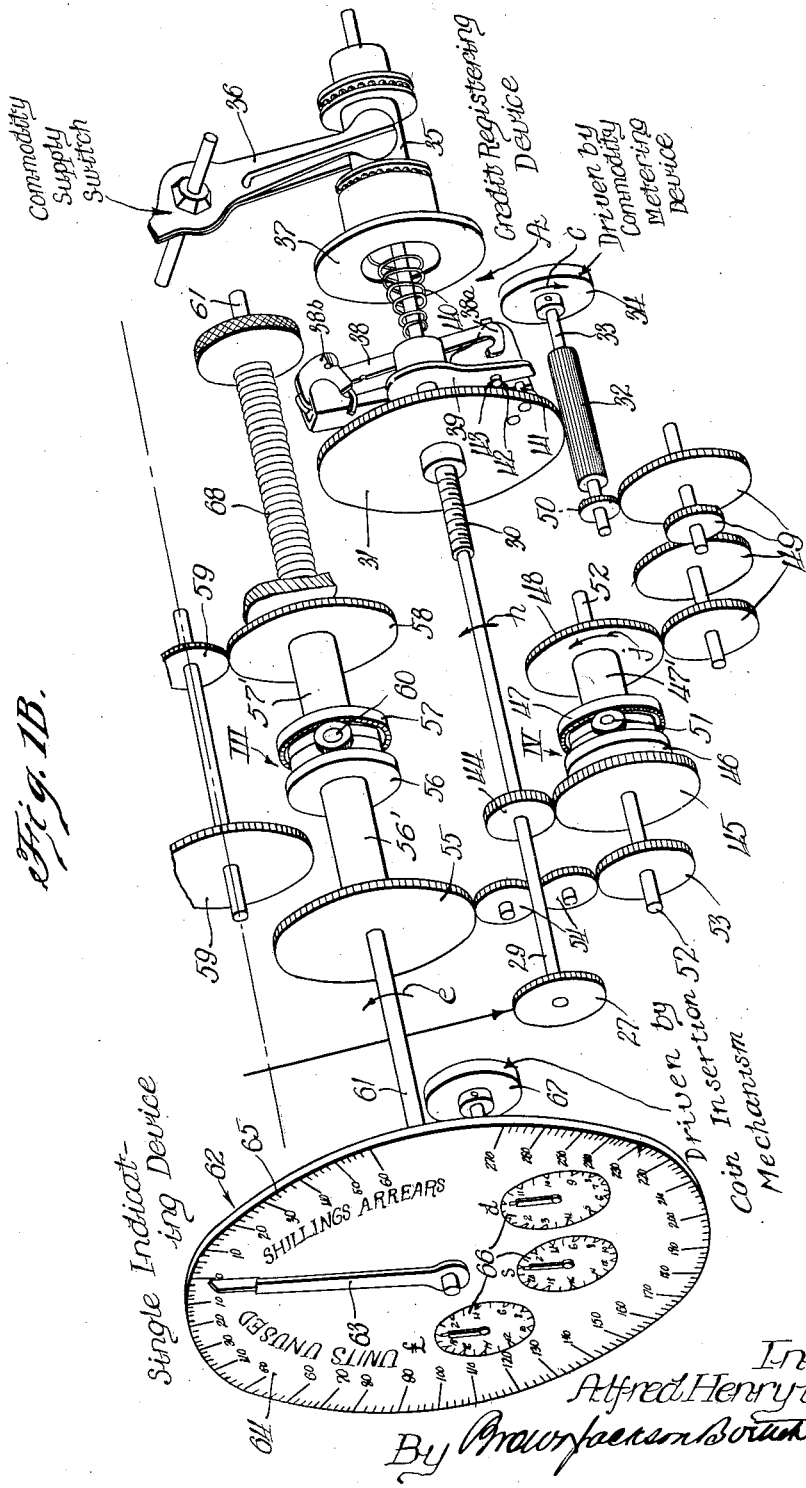

2,271,752

UNITED STATES PATENT OFFICE 2,271,752

PREPAYMENT MECHANISM

Alfred Henry Wickham, Enfield, England, assignor to Sangamo Electric Company, Springfield, Ill.

Application November 4, 1938, Serial No. 238,720
In Great Britain November 26, 1937

3 Claims. (Cl. 235—103.5)

The present invention relates to prepayment mechanisms for obtaining a supply of a commodity such as electricity and is more particularly concerned with prepayment mechanisms in which a charge is made which is additional to and independent of the charge made for the commodity consumed. Such additional charge, which is usually known as a "fixed charge," can be employed for collecting rent for the hire of apparatus or other like standing charge and includes a constant speed driving element which is effective in reducing the amount of commodity obtainable upon the insertion of a coin.

It will be understood that the constant speed driving element is effective whether or not the commodity is being consumed and it is thus possible that the mechanism may fall into arrears. Before a supply of the commodity can again be obtained, at least at the normal rate of charge, the arrears must be paid off and it is thus important that an accurate measurement of the amount of arrears should be made and that a visible indication of the actual cash value thereof be given to the consumer in order that he may know the amount of money which is required to be inserted before a supply of commodity can again be obtained.

The principal objects of the present invention are to provide improved arrangements for measuring the amount of arrears and for indicating whether and the extent to which the consumer is in credit or in arrears.

Broadly speaking the principal feature of the invention resides in the provision of a single indicating device for indicating both the extent of any credit due to the consumer and the amount of any arrears that are owing and preferably controlled in such a manner as to indicate the extent of any credit due in commodity values and the amount of any arrears charge in cash values.

The provision of a single indicator for indicating both credit and arrears gives rise to some difficulty particularly when it is arranged to read in some circumstances in cash values and in other circumstances in commodity units. This may be overcome according to another feature of the invention by arranging that the crediting movement due to coin insertion and debiting movement due to the collection of the fixed charge are transmitted by way of one gear train to the credit registering means and an indicator when the prepayment mechanism is in a credit condition and wherein crediting movement due to coin insertion and debiting movement due to the collection of the fixed charge are transmitted by way of another gear train to arrears computing means to the same arrears indicator when the prepayment mechanism is in an arrears condition.

The indicator device is preferably in the form of a member, for instance, a pointer movable in either direction from a single zero mark formed, for instance upon a stationary dial plate.

In order that the invention may be more readily understood a constructional embodiment thereof will now be described by way of example with reference to the accompanying drawings.

Figures 1A and 1B, taken together, show schematically in perspective one embodiment of my invention.

The arrangement shown comprises four differential gear devices I, II, III and IV. One sun wheel 10 of the differential I is rigidly connected by a sleeve 10' to a gear wheel 11 which is arranged to be driven in the direction of the arrow $a$ by the constant speed driving element which serves to assess the fixed charge. The constant speed driving element may, in the case where the invention is applied to the supply of alternating electric current, conveniently be a synchronous electric motor while the driving connection between such element and the gear wheel 11 may include some form of gear change device for adjusting the amount of fixed charge which is collected per unit time interval. The other sun wheel 12 of the differential I is rigidly connected by a sleeve 12' to a gear 13 while the planet-wheel carrier 14 is secured to a shaft 15 on which the sleeves 10' and 12' are loosely mounted for rotation. The shaft 15 carries a pinion 16 in driving connection through a gear train 17 with a gear 18 rigid with a shaft 19.

One sun wheel 20 of the differential gear II is connected by way of a sleeve 20' to a gear wheel 21 which is arranged in driving connection with a coin mechanism of the device, such as is shown in British Patent No. 445,606, the said gear wheel 21 being rotated in the direction of the arrow $b$ upon insertion of a suitable coin or coins. The other sun wheel 22 is connected by way of a sleeve 22' with a gear 23 which is in mesh with the gear 13 associated with the differential I. The planet wheel carrier 24 of the differential II is rigidly connected to a shaft 25 on which the sleeves 20' and 22' are loosely mounted for rotation. The shaft 25 carries a gear 26 which is in driving connection with a gear 27 through a suitable form of "price change unit," such as is disclosed in British Patent No. 436,914. This price change unit which is preferably located in a readily accessible position may comprise any suitable known form of device by which the gear ratio between the gears 26 and 27 may be varied according to the price which is to be charged for the commodity being supplied.

The gear 27 is secured to a shaft 29 which is provided with a screw-threaded portion 30 upon which is carried in movable manner a gear wheel 31 provided with an internally threaded hub in engagement with the portion 30 and a toothed periphery in mesh with a long pinion 32 which is carried upon a shaft 33 rigid with a crown wheel 34 adapted for driving engagement with the mechanism which effects metering of the commodity being supplied, for instance the watthour meter mechanism in the case of an electricity prepayment mechanism. The crown wheel 34 is arranged to be driven in the direction of the arrow c by operation of such metering mechanism.

The gear wheel 31 is adapted to be moved backwards and forwards along the threaded portion 30 relatively to the carrier plate 39 in one direction by insertion of coins into the coin mechanism and in the other direction by operation of the metering mechanism and the fixed charge collector. The gear wheel 31 forms part of a credit-registering device indicated generally by the reference character A and serving to control the supply of the commodity in accordance with whether the user is in credit or arrears. The mechanism as shown is adapted to control an electric supply switch and is more specifically shown and described in British Patent No. 414,070. It will not, therefore, be described in greater detail than is necessary for an understanding of the present invention. Briefly the device shown comprises a sliding collar 35 movable axially upon the shaft 29 and engaged by one end of a switch controlling arm 36. The collar 35 is provided with a flange 37 which can be engaged and held by one end of a catch lever 38 pivotally mounted upon a carrier plate 39 rigid with the shaft 29. The collar 35 is normally urged into the position shown by a spring 40 where the switch controlled by the arm 36 is opened and can only be retained in the opposite position with the flange 37 held by the end 38b of the lever 38 so long as a pin 41 on the gear 31 is withdrawn from possible contact with the end 38a of the lever 38. Contact between the pin 41 and the end 38a of the lever which is brought about by relative movement between the gear 31 and shaft 29 immediately causes the parts to assume the position shown with resultant opening of the controlled switch while the engagement of a further pin 42 on the gear 31 with a pin 43 on the plate 39 prevents further movement of the said gear in a direction towards the plate 39.

The shaft 29 carries a further pinion 44 which is in driving engagement with a gear 45 rigidly connected by a sleeve, not shown, to one sun wheel 46 of the differential gear device IV. The other sun wheel 47 of this differential is connected by a sleeve 47' to a gear 48 which is in driving connection by way of a gear train 49 with a pinion 50 secured to the shaft 33. The planet wheel carrier 51 of the differential IV is secured to a shaft 52 on which are loosely mounted the gear 45, sun wheel 46 and connecting sleeve on one side of the planet wheel carrier 51 while on the other side the sun wheel 47, gear 48 and connecting sleeve 47' are loosely mounted on the shaft 52. The shaft 52 is provided with a gear 53 in driving connection through a gear train 54 with a gear wheel 55 connected by way of a sleeve 56' to one sun wheel 56 of the differential gear device III.

The other sun wheel 57 is secured by means of a sleeve 57' to a gear 58 which is in driving connection with the shaft 19 by way of a gear train 59. The planet wheel carrier 60 of the differential III is rigidly connected to a spindle 61 on which the gear 55, sun wheel 56 and connecting sleeve 56' are loosely mounted on one side of the planet wheel carrier 60 while on the other side the sun wheel 57, gear 58 and connecting sleeve 57' are loosely mounted on the spindle 61. The spindle 61 extends at its forward end through a dial plate 62 and is provided at that end with a pointer 63 adapted to co-operate with two sets of markings 64 and 65 on the dial plate. The markings 64 serve to indicate the extent of any credit due to the user of the device in the particular units employed for measurement of the commodity whereas the markings 65 serve to indicate the extent of any arrears which are owing by the user in actual cash values. The dial plate 62 is also provided with three further indicators 66 for indicating the total cash value of the coins which have effected operation of the coin mechanism which is in driving connection with the gear wheel 21. These further indicators 66 are suitably geared together, and are driven by a crown wheel 67 connected in driving relationship with the coin insertion mechanism, such as shown in British Patent No. 445,606, previously referred to.

The end of the spindle 61 opposite to that carrying the pointer 63 is anchored to one end of a helical spring 68 surrounding the spindle, the other end of which spring is secured to a fixed part of the device, for instance a frame plate. The spring 68 is normally tensioned in such a manner that it tends to move the spindle 61 and pointer 63 in a clockwise direction as viewed from the front of the dial plate 62 towards the maximum arrears position.

The gear 18 on the shaft 19 is engaged by a further gear wheel 69 secured to a spindle 70 which is carried in suitable bearings in the fixed frame of the device and is provided with a collar 71 secured thereto. The collar 71 is anchored to one end of a helical spring 72 which surrounds the spindle 70 and which is secured at its other end to a fixed part of the device. The collar 71 is also provided with a radially projecting lug 73 which is adapted to engage with a pin projecting from a further lug 74 itself loosely mounted on the spindle 70. This further lug 74 is adapted to engage a pin projecting from another lug 75 which is also loosely mounted on the spindle 70 and is itself arranged to engage a pin projecting from yet a further lug 76. This last lug is also loosely mounted on the spindle 70 and co-operates with a fixed stop pin 77 carried by a fixed part of the device. This multiple lug structure serves as means for permitting a plurality of revolutions of the spindle 70 with a positive and accurate arrest in either direction, the various lugs and co-operating pins on the next adjacent lug or the fixed pin coming into engagement after the manner shown in the drawings at the end of the permitted amount of movement.

It will be understood that the drawings are schematic in character with various parts omitted or misplaced for the sake of clarity of illustration. For instance all of the shafts or spindles are actually carried in suitable bearings formed in supporting frame plates while the gear ratios of and number of gear wheels in the various gear trains may be varied as required from those shown.

The operation of the device as shown is as follows: Assuming that the mechanism is in the zero credit, zero arrears position where the switch controlled by the arm 36 has just been opened. In this position the various parts are in the position shown with the spring 72 effective to bring the lugs 73 to 76 in engagement with each other and with the stop-pin 77.

Insertion of one or more coins into the coin mechanism connected to gear wheel 21 will cause rotation of the latter and the sun wheel 20 of differential II in direction b. The other sun wheel 22 of differential II is held against movement in direction f by reason of locking of sun wheel 10 of differential I by the fixed charge device and by locking of shaft 70 against rotation in direction d by stop pin 77. In consequence the movement of gear 21 will be transmitted to planet wheel carrier 24 and shaft 25 and then through price change unit 28 to shaft 29 which is moved in direction h to effect an appropriate crediting operation in the credit registering means A. This movement of shaft 29 is also transmitted to sun wheel 46 of differential IV where the planet wheel carrier 51 and shaft 52 are rotated owing to locking of the other sun wheel 47 by its connection to the metering device through crown wheel 34. The movement of shaft 52 is transmitted as movement in direction e to sun wheel 56 of differential III. The other sun wheel 57 of this differential is prevented from rotation in a direction opposite to that of arrow e by the engagement of lugs 73 to 76 on interconnected shaft 70 with pin 77. The resultant movement is one of planet carrier 60 and spindle 61 in direction e to cause an appropriate reading in terms of "units unused" on the scale markings 64 by the pointer 63. This movement of spindle 61 is effected against the action of spring 68. The cash value of the coins inserted in the mechanism will be indicated by an increase in the reading of the indicators 66. The coin insertion operation also causes resetting of the switch tripping means 37, 38 in known manner so that electricity can now be supplied.

Consumption by the metering device connected to the crown wheel 34 will cause movement of the latter in direction c, which movement is transmitted by long pinion 32 to gear 31 to cause appropriate decrease in the credit registered in the means A. This movement of pinion 32 is also transmitted to sun wheel 47 of differential IV by gear 50, gear train 49 and gear 48. As sun wheel 46 of this differential is now held by its connection back to coin mechanism through differential II the movement of sun wheel 47, which is in direction j will cause similar movement of planet carrier 51 and shaft 52 which in turn act through the differential III to return the spindle 61 in a direction opposite to that of the arrow e so as to return the credit registering mechanism and pointer 63 back towards zero position where the switch controlled by the lever 36 will be opened by tripping of catch arm 38 by pin 41 on gear 31 in known manner. The return movement of spindle 61 in a direction opposite to that of arrow e is assisted by spring 68.

The constant speed element of the fixed charge collector is also operative in the meantime upon the gear wheel 11 to cause movement of the latter in the direction a. Taking the case first where the credit registering means A are in credit, then such movement of gear 11 will be transmitted to sun wheel 22 of differential II through gears 13 and 23 since the planet carrier 14 of differential I cannot rotate in the desired direction owing to the resistance of the spring 72 operative upon the interconnected shaft 70. This movement of sun wheel 22, which is in direction f, causes movement of planet carrier 24 as the other sun wheel 20 is held by engagement with the coin mechanism connected to gear 21, and thus in turn is transmitted by way of the price change unit to the shaft 29 where it acts to move the latter in a direction opposite to that of arrow h to cause appropriate decrease in the credit registered by the means A. This motion transmission from the shaft 25 to shaft 29 is similar but in opposite direction to that imparted by operation of the coin mechanism and in each case the original movement bearing a relation to a cash value is converted into one bearing a relation with the actual quantity of electricity which is to be credited or debited by means of the price change unit. In similar manner to the coin insertion operation the decrease in credit due to the fixed charge is indicated by movement of the pointer 63 back towards zero due to motion transmitted through gears 44, 45, differential IV, gears 53, 54 and 55 to differential III.

When the credit registering means reaches zero credit position the pins 42, 43 on the gear 31 and carrier plate 39 respectively engage one another and lock the shaft 29 against further movement in a direction opposite to that of the arrow h. Movement of the constant speed driving element of the fixed charge collecting device to rotate the gear wheel 11 in the direction a now causes movement of the planet carrier 14 of differential I since the other sun wheel 12 cannot rotate in the required direction owing to the locking of shaft 29 to which it is connected through gears 13, 23, differential II and the price change unit.

The movement of the planet carrier 14 is in the direction g and causes rotation of the shaft 70 in direction k through gear 16, gear train 17, and gears 18 and 69. This movement of the shaft acts to stress the spring 72 and causes movement of the lug 73 away from the adjacent lugs 74 to 76. The movement of the planet carrier 14 is also transmitted by way of gear 16, gear train 17, gear 18, gear train 59 and gear 58 to the sun wheel 57 of differential III. As the other sun wheel 56 is at this moment held by its geared connection with the stationary shaft 29 and the now idle metering mechanism, the movement of the sun wheel 57 causes movement of the planet carrier 60 and spindle 61 in a direction opposite to the arrow e whereby the pointer 63 is moved over the scale markings 65 to indicate the amount of the arrears charge in "shillings arrears." Since such movement is effected by way of a gear train which does not include the price change unit the markings 65 can be made in actual cash values and will remain unchanged irrespective of any alteration in the price charged per unit for the commodity itself.

The insertion of one or more coins in the coin mechanism while the device is in arrears again causes movement of the gear 21 in direction b but in this case there are two possible paths over which the movement may be transmitted. The movement may be transmitted as previously described by way of the price change unit to cause a credit setting operation of the registering means A or, alternatively, the movement may be transmitted by gear 16, gear train 17 and gears 18 and 69 to move the spindle 70 in direction $d$. As this latter movement coincides with the tendency of the now stressed spring 72 to resume its normal unstressed condition, the said movement of the gear 21 takes this path and any movement due to coin insertion acts to return the lug 73 in the direction $d$ until it is again arrested by the pin 77 through the lugs 74 to 76. This position corresponds to the zero credit, zero debit state and thereafter, as further movement of spindle 70 in direction $d$ is prevented, any further coin insertion movement causes appropriate crediting over the train including the price change unit in the manner previously described. The decrease of the arrears by return of the spindle 70 in direction $d$ is transmitted to the pointer 63 by way of gears 59, 58 and differential III as before to give the appropriate reading on the dial plate 62.

By means of the arrangement above described the actual state of either credit or arrears is indicated by a single pointer co-operating with a single dial thereby avoiding the confusion frequently found to exist in the minds of persons inexperienced in such matters when two separate dials are employed.

While the preferred arrangement is that above described it will be clear that the arrangement of duplicate gear trains one for operation during credit state of the apparatus and another during arrears state and both operative upon the same indicator may still be employed when the credit indication is given in coins unused instead of commodity units unused. In this case the gear train between the gears 26 and 27 would be of fixed ratio and the price change unit 28 placed in the gear train from the metering device to the credit registering mechanism A.

I claim:

1. In a prepayment mechanism for controlling the supply of electricity or like commodity in which arrears due to a fixed charge, credit diminution due to commodity usage and credit increase and arrears removal due to coin insertion are automatically balanced and the net result indicated on a single indicating device, in combination: a first differential gear device including a first pair of sun wheels and a first planet wheel carrier; a second differential gear device including a second pair of sun wheels and a second planet wheel carrier; means operatively interconnecting a sun wheel of said first differential gear device with a sun wheel of said second differential gear device; arrears registering means comprising first spring means operatively connected to said first planet wheel carrier and adapted to be stressed as arrears increase and stop means operatively connected to said first planet wheel carrier to prevent rotation thereof when said prepayment mechanism is in credit condition; a third differential gear device including a third pair of sun wheels and a third planet wheel carrier; means operatively interconnecting said arrears registering means with a first of said third pair of sun wheels; second spring means; means operatively interconnecting said second spring means and said third planet wheel carrier; a single indicating device; means operatively interconnecting said single indicating device with said third planet wheel carrier; a fourth differential gear device including a fourth pair of sun wheels and a fourth planet wheel carrier; means operatively interconnecting said fourth planet wheel carrier with the second of said third pair of sun wheels; and means operatively interconnecting one of said fourth pair of sun wheels with said second planet wheel carrier.

2. In a prepayment mechanism for controlling the supply of electricity or like commodity in which arrears due to a fixed charge, credit diminution due to commodity usage and credit increase and arrears removal due to coin insertion are automatically balanced and the net result indicated on a single indicating device, in combination: a first differential gear device including a first pair of sun wheels and a first planet wheel carrier; a second differential gear device including a second pair of sun wheels and a second planet wheel carrier; means operatively interconnecting a sun wheel of said first differential gear device with a sun wheel of said second differential gear device; arrears registering means comprising first spring means operatively connected to said first planet wheel carrier and adapted to be tightened as arrears increase and stop means operatively connected to said first planet wheel carrier to prevent rotation thereof when said prepayment mechanism is in credit condition; a third differential gear device including a third pair of sun wheels and a third planet wheel carrier; means operatively interconnecting said arrears registering means with a first of said third pair of sun wheels; second spring means; means operatively interconnecting said second spring means and said third planet wheel carrier; a single indicating device comprising a dial plate, an arrears scale in money units on said dial plate, a credit scale in commodity units on said dial plate, said arrears and credit scales having a common zero point, and a pointer for passing over said dial plate and adjusted to be at the common zero point when said prepayment mechanism is in the zero credit, zero arrears condition; means operatively interconnecting said pointer with said third planet wheel carrier; a fourth differential gear device including a fourth pair of sun wheels and a fourth planet wheel carrier; means operatively interconnecting said fourth planet wheel carrier with the second of said third pair of sun wheels; and means operatively interconnecting one of said fourth pair of sun wheels with said second planet wheel carrier.

3. In a prepayment mechanism for controlling the supply of electricity or like commodity in which arrears due to a fixed charge, credit diminution due to commodity usage and credit increase and arrears removal due to coin insertion are automatically balanced and the net result indicated on a single indicating device, in combination: a first differential gear device including a first pair of sun wheels and a first planet wheel carrier; a second differential gear device including a second pair of sun wheels and a second planet wheel carrier; means operatively interconnecting a sun wheel of said first differential gear device with a sun wheel of said second differential gear device; arrears registering means comprising first spring means operatively connected to said first planet wheel carrier and adapted to be stressed as arrears increase and stop means operatively connected to said first planet wheel carrier to prevent rotation thereof when said prepayment mechanism is in credit condition; a third differential gear device including a third pair of sun wheels and a third planet wheel carrier; means operatively interconnecting said arrears registering means with a first of said third pair of sun wheels; second spring means; means operatively interconnecting said second spring means and said third planet wheel carrier; a single indicating device; means operatively interconnecting said single indicating device with said third planet wheel carrier; a fourth differential gear device including a fourth pair of sun wheels and a fourth planet wheel carrier; means operatively interconnecting said fourth planet wheel carrier with the second of said third pair of sun wheels; a price change unit; means operatively interconnecting said second planet wheel carrier and said price change unit; and means operatively interconnecting one of said fourth pair of sun wheels with said price change unit.

ALFRED HENRY WICKHAM.